US009261116B2

(12) United States Patent
Arce-Gonzalez (10) Patent No.: US 9,261,116 B2
(45) Date of Patent: Feb. 16, 2016

(54) HYDRAULIC VALVE WITH HELICAL ACTUATOR

(71) Applicant: The Boeing Company, Seal Beach, CA (US)

(72) Inventor: Luis A. Arce-Gonzalez, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 207 days.

(21) Appl. No.: 13/953,586

(22) Filed: Jul. 29, 2013

(65) Prior Publication Data

US 2015/0027547 A1    Jan. 29, 2015

(51) Int. Cl.
| | |
|---|---|
| F15B 13/04 | (2006.01) |
| F15B 13/042 | (2006.01) |
| F16K 31/524 | (2006.01) |
| F16K 31/122 | (2006.01) |
| F16K 11/076 | (2006.01) |
| F16K 11/085 | (2006.01) |

(52) U.S. Cl.
CPC ........... *F15B 13/0406* (2013.01); *F15B 13/042* (2013.01); *F15B 13/0426* (2013.01); *F16K 11/076* (2013.01); *F16K 11/0856* (2013.01); *F16K 31/122* (2013.01); *F16K 31/1221* (2013.01); *F16K 31/1225* (2013.01); *F16K 31/524* (2013.01); *Y10T 137/0318* (2015.04); *Y10T 137/7761* (2015.04); *Y10T 137/86751* (2015.04); *Y10T 137/87885* (2015.04)

(58) Field of Classification Search
CPC ............. F15B 13/0406; F15B 13/0426; F16K 31/524; F16K 11/076; F16K 11/0856; F16K 31/1225; F16K 31/1221; F16K 31/122

USPC ............... 137/625.32, 487.5, 884, 1; 251/263
See application file for complete search history.

(56) References Cited

U.S. PATENT DOCUMENTS

| | | | | |
|---|---|---|---|---|
| 3,370,827 | A | | 2/1968 | Stehlin |
| 3,695,295 | A | * | 10/1972 | Olsen et al. ............. 137/625.69 |
| 3,818,926 | A | * | 6/1974 | Wohlwend .................... 137/101 |
| 4,557,344 | A | * | 12/1985 | Lang ............................ 180/421 |
| 4,595,213 | A | * | 6/1986 | Tsuchie ........................ 280/293 |

(Continued)

FOREIGN PATENT DOCUMENTS

| | | |
|---|---|---|
| DE | 2344722 | 3/1974 |
| DE | 2652228 | 5/1978 |
| WO | WO9504207 | 2/1995 |

OTHER PUBLICATIONS

Patent Cooperation Treaty, International Search Report and Written Opinion for PCT/US2014/042294 dated Oct. 13, 2014.

*Primary Examiner* — Craig Schneider
*Assistant Examiner* — Kevin Barss
(74) *Attorney, Agent, or Firm* — Parsons Behle & Latimer (57) ABSTRACT

A hydraulic spool valve includes a housing, a valve element disposed within the housing, a first piston coupled to the valve element, and a first biasing member. The housing includes a pair of first ports. The valve element is selectively moveable within the housing between a first closed position and a second open position allowing fluid communication between the first ports. Hydraulic pressure against the first piston causes helical translation of the piston in a first direction, and motion of the valve element in a first direction from the first position toward the second position. The first biasing member is configured to bias the first piston and the valve element toward the first position.

19 Claims, 9 Drawing Sheets

(56) References Cited

U.S. PATENT DOCUMENTS

| | | | |
|---|---|---|---|
| 5,507,315 A * | 4/1996 | Parker | 137/625.43 |
| 5,733,105 A * | 3/1998 | Beckett et al. | 417/269 |
| 6,231,027 B1 | 5/2001 | Baker et al. | |
| 6,793,194 B1 | 9/2004 | Grinberg | |
| 6,830,059 B1 * | 12/2004 | Zeiber et al. | 137/1 |
| 6,986,499 B2 | 1/2006 | Davis et al. | |
| 8,387,644 B2 * | 3/2013 | Najmolhoda et al. | 137/1 |
| 2008/0185476 A1 * | 8/2008 | Suisse et al. | 244/78.1 |

* cited by examiner

HYDRAULIC VALVE WITH HELICAL ACTUATOR

BACKGROUND

1. Field of the Invention

The present invention relates generally to hydraulic valves. More particularly, the present invention relates to a hydraulic spool valve having an internal helical actuator.

2. Related Art

Spool valve manifolds are used to accomplish opening and closing of ports, such as for directing hydraulic fluid to various hydraulic devices. These types of manifolds are frequently used in aircraft, for example, to selectively direct hydraulic fluid between actuators for ailerons, flaps, rudders and other flight surfaces, as well as actuators for landing gear, thrust reversers, and other hydraulic devices.

Current spool valve manifolds tend to be relatively large and heavy. They are typically long in order to accommodate a number of ports that are sequenced in-line (e.g. neutral, open, & closed positions). This length and size gives them a fairly large volume. These types of valves also tend to be heavy because they are often machined from solid metals, such as titanium. The size, weight and volume of typical hydraulic spool valve manifolds is a concern in the field of aviation and other applications of these types of valves.

SUMMARY

It has been recognized that it would be advantageous to develop a hydraulic spool valve that can accommodate a number of ports and yet is relatively small and lightweight.

It has also been recognized that it would be advantageous to have a hydraulic spool valve that is self-actuated and yet is relatively simple and robust in operation.

In accordance with one embodiment thereof, the present disclosure provides a hydraulic spool valve having a housing, a valve element disposed within the housing, a first piston coupled to the valve element, and a first biasing member. The housing includes a pair of first ports. The valve element is selectively moveable within the housing between a first closed position and a second open position allowing fluid communication between the first ports. Hydraulic pressure against the first piston causes helical translation of the piston in a first direction, and motion of the valve element in a first direction from the first position toward the second position. The first biasing member is configured to bias the first piston and the valve element toward the first position.

In accordance with a more specific embodiment thereof, the valve includes a pair of second ports in the housing, a second piston, and a second biasing member. The valve element is selectively moveable between the first position, the second position, and a third position allowing fluid communication between the second ports. The second piston is coupled to the valve element and helically moveable within the housing, hydraulic pressure against the second piston causing helical translation of the second piston in the first direction, and axial rotation of the valve element in the first direction toward the third position. The second biasing member is configured to bias the second piston and the valve element toward the first position and away from either the second or third positions, the first biasing member further configured to bias the first piston and the valve element toward the first position and away from either the second or third positions.

In accordance with another aspect thereof, the disclosure provides a hydraulic manifold, having a cylindrical housing, a cylindrical valve element, rotatably disposed within the housing, an actuator, including a first piston, disposed within the housing, and a first spring. The housing includes a pair of first ports configured to couple between a hydraulic source and a hydraulic device. The valve element has a first position in which the first ports are closed, and a second position in which the first ports are open and fluidly connected. The actuator is configured to rotate the valve body to selectively open or close the ports, and the piston is mechanically coupled to the valve element and helically moveable in a first direction against a first cam surface of the housing in response to hydraulic pressure. The first spring is configured to bias the piston and the valve element toward the first position, helical translation of the piston in the first direction causing at least axial rotation of the valve element in the first direction.

In accordance with yet another aspect thereof, the disclosure provides a method for converting a pilot pressure and a linear motion into a rotational motion within a hydraulic helical valve assembly. The method includes providing hydraulic pilot pressure to a cylinder having a first moveable piston therein, the first piston being mechanically coupled to a moveable valve element. The method further includes applying the pilot pressure to an outer surface of the first piston, causing the first piston to helically translate in a first direction within the cylinder against a first biasing member and thereby move the valve element, whereby linear pressure against the first piston is converted into at least rotational motion of the valve element in the first direction between a closed position and a first open position with respect to at least a first pair of valve ports in the cylinder. The method further includes continuing application of the pilot pressure until the valve element reaches the first open position.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
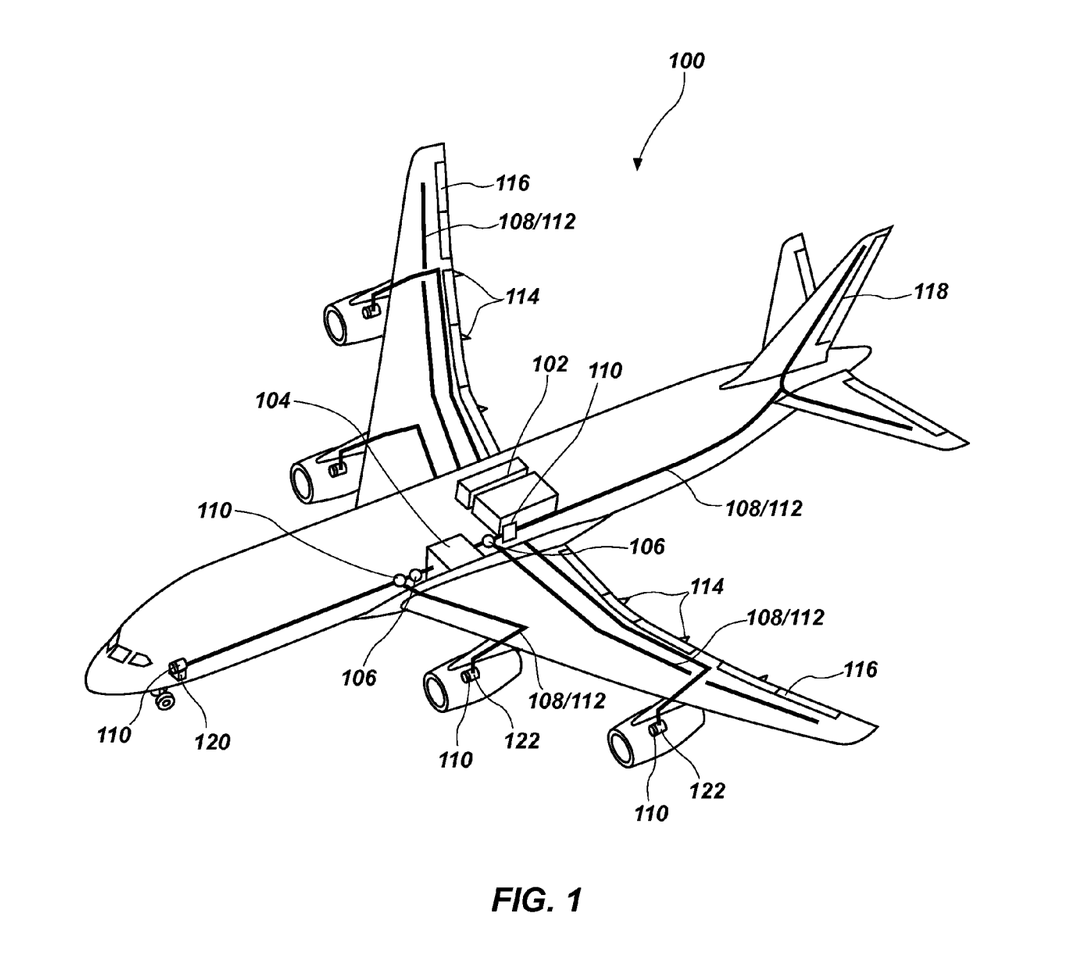
FIG. 1 is a schematic diagram of an aircraft having a hydraulic system that includes a hydraulic spool valve.

There are a wide variety of machines and devices that make use of hydraulic valves and hydraulic manifolds. These include vehicles, such as automobiles, aircraft and earth-moving equipment, as well as industrial machinery, for example. An aircraft 100 is shown in FIG. 1 as an example of a machine that includes a hydraulic system 102. In this schematic diagram of the hydraulic system of the aircraft, it can be seen that the aircraft includes a hydraulic reservoir 104, one or more hydraulic pumps 106, and various hydraulic supply lines 108 that connect to a plurality of hydraulic spool valves or manifolds 110. From these various hydraulic manifolds, additional hydraulic lines 112 extend to a variety of hydraulic devices, such as actuators for flight control surfaces (e.g. flap actuators 114, aileron actuators 116, rudder actuators 118, etc.), as well as to landing gear actuators 120 and the aircraft engines 122 for controlling reverse thrust actuators, etc. Other types of hydraulic devices can also be associated with the aircraft 100 and its hydraulic system 102.

The hydraulic system 102 illustrated in FIG. 1 is only one type of hydraulic system that uses hydraulic spool valves or manifolds 110. Other types of hydraulic systems can also use similar hydraulic valves. For example, systems that pump other liquids (such as fuel or water) between multiple locations can also use hydraulic manifolds and valves like those shown in the aircraft 100 of FIG. 1.

Figure 2:
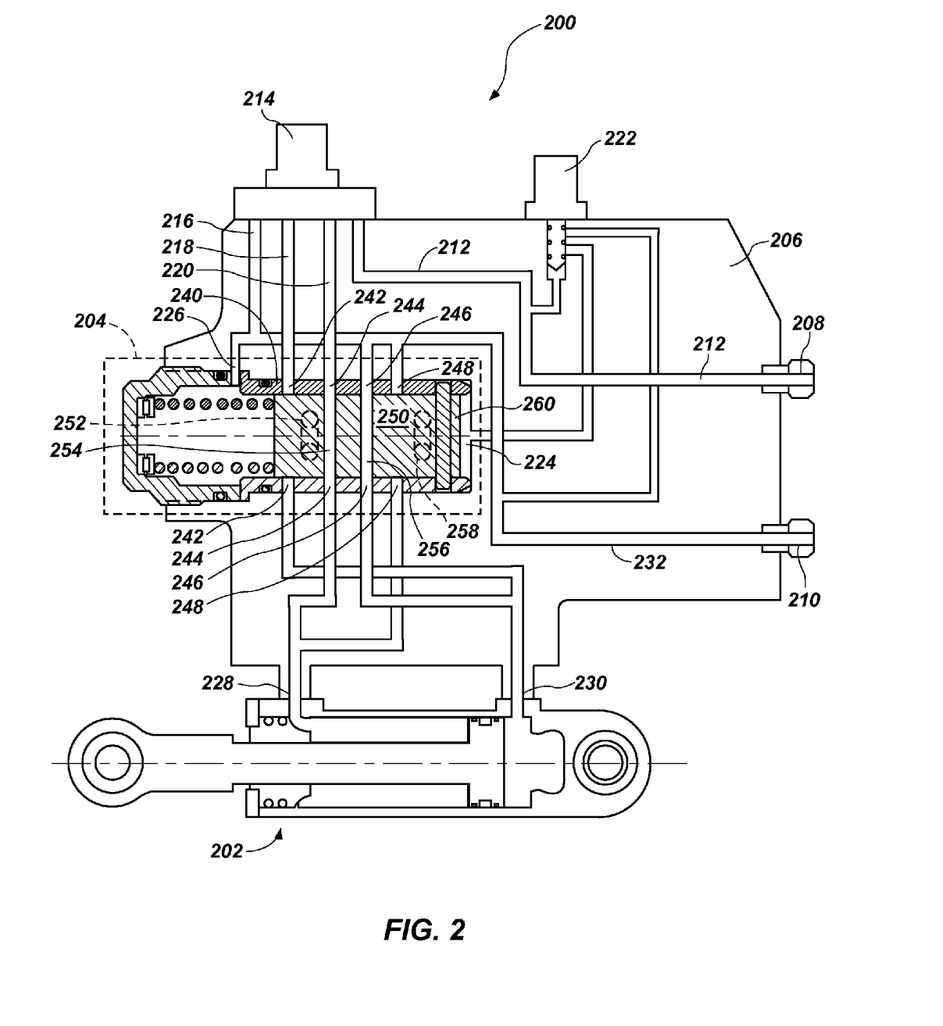
FIG. 2 is a schematic diagram of a hydraulic system having a hydraulic actuator device controlled by an embodiment of a dual mode hydraulic valve with a helical actuator, in accordance with the present disclosure

As noted above, hydraulic spool valves that are used in hydraulic systems like that shown in FIG. 1 can be large and heavy. Advantageously, as disclosed herein, a hydraulic spool valve with an internal actuator has been developed that can be smaller and lighter than some other valves that are used for similar purposes with a valve manifold. Shown in FIG. 2 is a schematic diagram of a hydraulic system 200 having a hydraulic actuator device 202 that is controlled by an embodiment of a dual mode hydraulic valve 204 with a helical actuator in accordance with the present disclosure. This system includes a hydraulic spool valve, outlined at 204, which is incorporated into a hydraulic manifold 206. The hydraulic manifold 206 includes an input port 208 for a hydraulic pressure line, and an output port 210 for a hydraulic return line. The input port 208 is in fluid communication with a hydraulic pressure source, such as a hydraulic pump and reservoir (not shown). High pressure fluid enters the manifold 206 through the input port 208, and lower pressure fluid returns to the reservoir through the output port 210.

Inside the manifold 206, a pressure line 212 extends to a servo valve 214. This servo valve 214 can be an electro-hydraulic servo valve (EHSV), a type of valve that is well known to those of skill in the art. This type of valve controls how hydraulic fluid is ported to an actuator. Servo valves and servo-proportional valves are operated by transforming a changing analogue or digital input signal (transmitted by, e.g. electrical wiring, not shown) into movements in a hydraulic cylinder. Servo valves can provide precise control of position, velocity, pressure and force with good post movement damping characteristics.

This servo valve 214 selectively directs the high pressure hydraulic fluid to one of three conduits 216, 218, 220. The hydraulic pressure conduit 212 also branches to a solenoid operated valve 222 that selectively provides pilot pressure to the spool valve 204 in order to actuate that valve. The spool valve 204 in FIG. 2 is a two-position, multi-port spool valve. This valve 204 includes a pilot port 224 and a return port 226. In FIG. 2 the valve 204 is shown in the closed or non-actuated position. The solenoid operated valve 222 is in the closed position, so that hydraulic pressure is not directed to the pilot port 224, and the actuator 202 is in the retracted (i.e. not extended) position. In this condition the higher pressure fluid from the high pressure line 212 is directed toward the retraction port 228 of the actuator 202, and fluid from both the solenoid operated valve 222 and the extension port 230 of the actuator 202 is connected to the low pressure return line 232, which is fluidly connected to the output port 210.

When the solenoid operated valve 222 opens, high pressure hydraulic fluid is provided through the pilot port 224 to the spool valve 204, causing the spool valve to open, allowing high pressure fluid to extend to the extension port 230 of the actuator 202, and allowing lower pressure fluid from the retraction port 228 of the actuator 202 to flow back to the return line 232. This causes the actuator 202 to extend.

Figure 3:
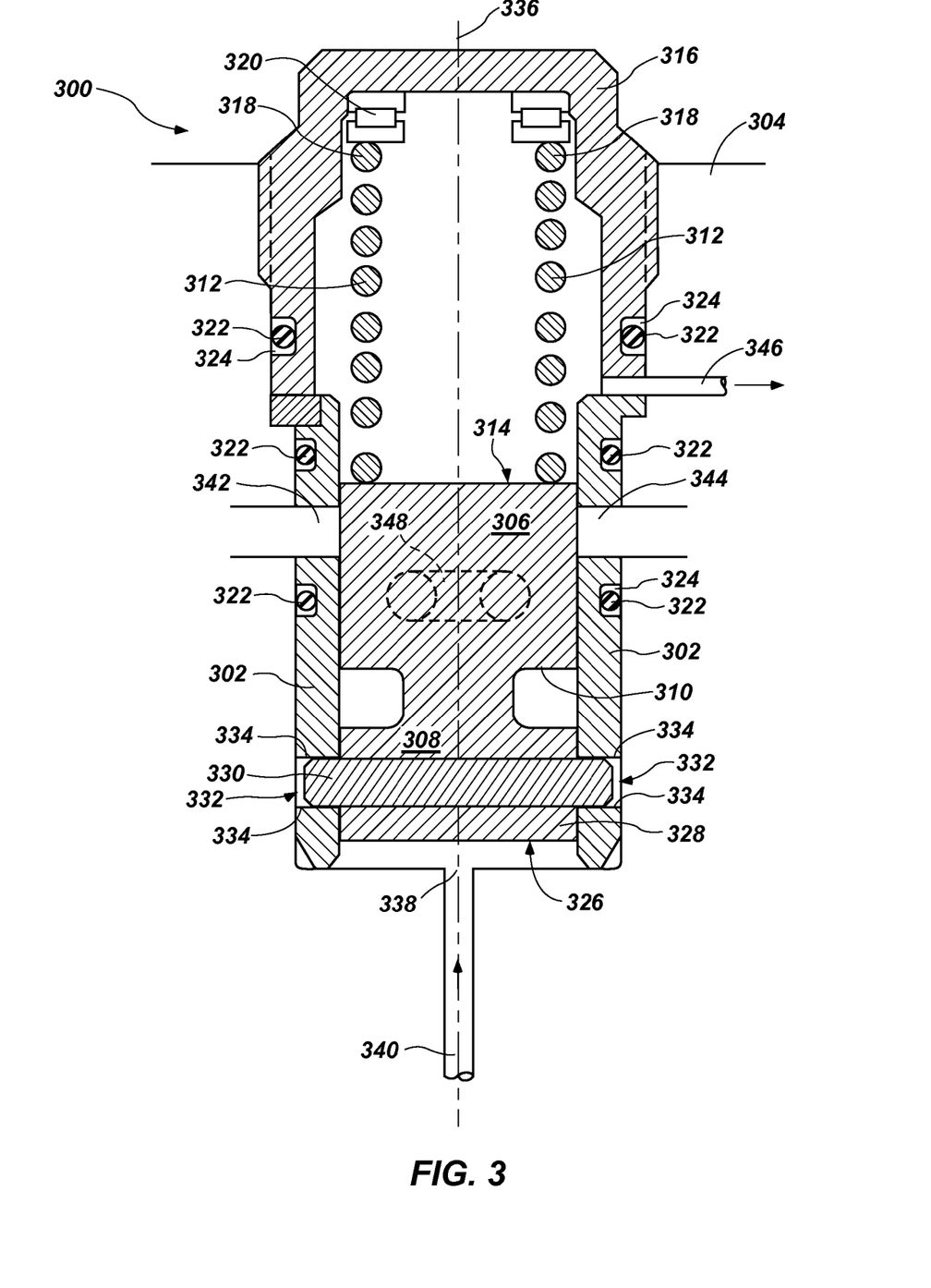
FIG. 3 is a cross-sectional view of an embodiment of a single mode (open/close) hydraulic valve with a helical actuator in accordance with the present disclosure, with the valve in the closed position.

Advantageously, the spool valve 204 shown in FIG. 2 is a helically actuated spool valve that translates linear pressure against a piston into rotational movement of the valve to open and close one or more ports. Shown in FIG. 3 is a cross-sectional view of an embodiment of a single mode (open/close) hydraulic spool valve 300 with a helical actuator in accordance with the present disclosure. This valve 300 generally includes a housing or cylinder 302, which is mounted in a manifold 304 or other supporting structure. A valve element 306 is moveably disposed within the housing 302, and a piston 308 is mechanically coupled to the proximal end 310 of the valve element 306. In the embodiment of FIG. 3, the valve element 306 and piston 308 are a single integral unit, as discussed in more detail below. A biasing member 312, such as a coil spring, is positioned against the distal end 314 of the valve element 306 within a cap 316, which is also supported in the manifold 304 and connected to the housing 302. The distal end 318 of the spring 312 can be positioned to bear against a thrust bearing 320, and one or more o-rings 322 can be disposed in suitable channels 324 in the housing 302 and the cap 316, and/or in the manifold 304, to provide a seal against leakage of hydraulic fluid.

Figure 4:
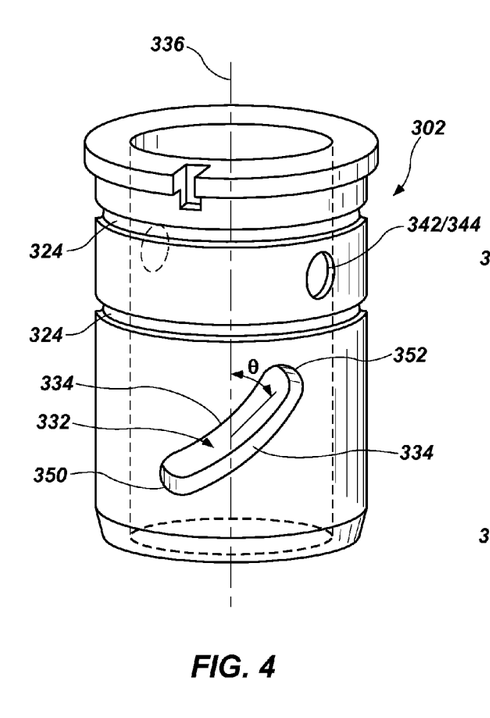
FIG. 4 is a perspective detail view of the helical sleeve of the valve of FIG. 3.
Figure 5:
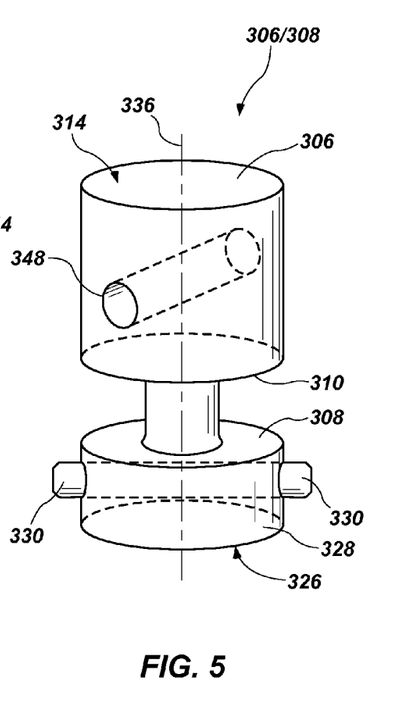
FIG. 5 is a perspective detail view of the piston/valve element of the valve of FIG. 3.

A perspective view of the housing 302 of this valve 300 is shown in FIG. 4 and a perspective view of the valve element/piston 306/308 is shown in FIG. 5. The valve element/piston 306/308 includes a piston head 326 at its proximal end 328, and a distal end 314 that is positioned against the biasing spring 312. The valve element/piston 306/308 also includes a pin 330, extending transversely through it. This pin is configured to slide within a helical slot 332 in the housing 302, which allows the valve element/piston 306/308 to helically twist when the piston head 326 is pushed by hydraulic pressure urging it to move linearly within the sleeve 302, against the force of the biasing spring 312. The pin sliding in the helical slot can be lubricated by the hydraulic fluid itself, or other lubrication methods can be used.

The helical slot 332 has edge surfaces 334 that provide a cam surface, connected between the piston 308 and the housing 302, causing the helical motion of the valve element/ piston 306/308. The pin 330 and the slot 332 thus function as a helical cam actuator, coupled between the piston 308 and an interior wall of the housing 302. The edge surfaces 334 of the slot 332 provide cam surfaces, which are coupled between the piston 308 and the cylinder 302, the cam surfaces causing axial rotation of the piston 308 as it linearly translates within the cylinder 302. These cam surfaces function much like intermeshing helical threads, and can be configured in a variety of ways. For example, the embodiment shown in FIGS. 3-5 includes two helical slots, one on each side of the housing 302, in which opposing ends of the pin slide. However, it will be apparent that different numbers of slots can be used, and these can be configured in a variety of ways. For example, a system in which the pin extends from only one side of the piston and fits into only one slot in the housing can be used, as can configurations with three or more helical slots and corresponding pins. On the other hand, a helical slot can be provided in the side of the piston, with a fixed pin extending from the housing into the slot. The first and second helical cam surfaces are coupled between an interior wall of the housing and an outer surface of the piston, and The angle θ of the helical slot 332 relative to a long axis 336 of the housing 302 can be referred to as its pitch, and for a helix will always be more than 0° and less than 90° (a pitch of 0° will be exactly perpendicular to the long axis of the housing—and thus being a ring or cylinder, not a helix at all—and a pitch of 90° will be a line parallel to the axis of the housing). The pitch of the helical slot 332 can vary, depending on the desired degree of rotation of the valve element/piston 306/ 308 relative to a given linear translation, and the intended actuation force. In general, the pitch can be selected to match the amount of angular rotation needed to rotate the valve element in order to open and close the ports for a given linear translation of the piston. It is believed to be desirable that the helical cam surfaces have a relatively broad pitch, such as from about 40° to about 65°. This provides several advantages. First it reduces friction in the actuator portion of the valve. That is, a flatter angle of the helical cam surfaces relative to the axis of the piston reduces the wedge forces that tend to resist the helical motion. A relatively broad pitch of the helical cam surfaces also reduces the magnitude of angular rotation of the piston per unit of linear motion of the piston. This helps to promote accuracy of operation of the valve. As noted, a pitch of from about 40° to about 65° (measured relative to the axis of the piston) is suitable, though it is believed that other pitch values outside this range can also be used. In one particular embodiment, a helical pitch of 45° has been used.

Those of skill in the art will appreciate that the force required to move the piston will decrease as the pitch of the helix increases. However, it will also be apparent that the linear travel or lead travel of the valve element/piston 306/308 will also increase for a given rotational configuration as the pitch increases. The linear travel of the piston relative to the pitch of the helix can be given by the following expression:

$$L=(2\pi R)/\tan\theta \quad [1]$$

In which L is the lead travel, R is the radius of the piston 308, which is approximately the same as (though slightly less than) the inner radius of the housing 302, and θ is the pitch angle of the helical slot 332.

The proximal end of the housing 302 includes a pilot pressure port 338, adjacent to the piston head 326. The pilot pressure port 338 is configured to allow high pressure hydraulic fluid from a pilot pressure line 340 to enter the housing 302. The housing 302 also includes a pair of hydraulic ports, including a first port 342 and a second port 344. The first and second ports can communicate between any desired hydraulic source and destination. For example, the first port 342 can be in fluid communication with a high pressure hydraulic source (e.g. a pump), and the second port 344 can be in fluid communication with a hydraulic device (e.g. a hydraulic actuator). A hydraulic return line 346 is also fluidly connected to the cap 316, to allow the return of low pressure hydraulic fluid when the valve element/piston 306/308 extends.

As described above with respect to FIG. 2, the pilot pressure line 340 is connected through a valve, such as a solenoid operated ball valve, that selectively allows high pressure hydraulic fluid to flow to the pilot port 338. The valve element 306 includes a valve aperture 348 extending transversely through it. In the embodiment of FIG. 3 the valve element 306 is a generally cylindrical body, and is configured to move (e.g. rotate or helically translate) between a first closed position, in which the hydraulic ports 342, 344 are blocked, and a second open position in which the aperture 348 is aligned line with the hydraulic ports 342, 344, allowing fluid communication between the hydraulic ports. The piston 308 is coupled to the valve element 306, and hydraulic pressure against the head 326 of the piston 308 causes helical translation of the valve element 306, thus causing the aperture 348 to line up in this way, thus opening the valve 300.

The view of FIG. 3 shows the valve 300 in a first or closed position, with the piston 308 in its furthest retracted position, and the valve aperture 348 in a first position, misaligned relative to the hydraulic ports 342, 344. The valve element/ piston 306/308 is biased toward this first position by the spring 312. To open the valve 300, hydraulic fluid is introduced through the pilot port 338, putting pressure against the head 326 of the piston 308. This pressure urges the piston 308 to move linearly within the housing 302 against the force of the spring 312. However, the cam surfaces 334 of the helical slot 332 act upon the transverse pin 330, causing helical translation of the piston 308 in a first direction, and concomitant motion (in this case helical translation) of the valve element 306 in the first direction from the first position toward the second open position.

Figure 6:
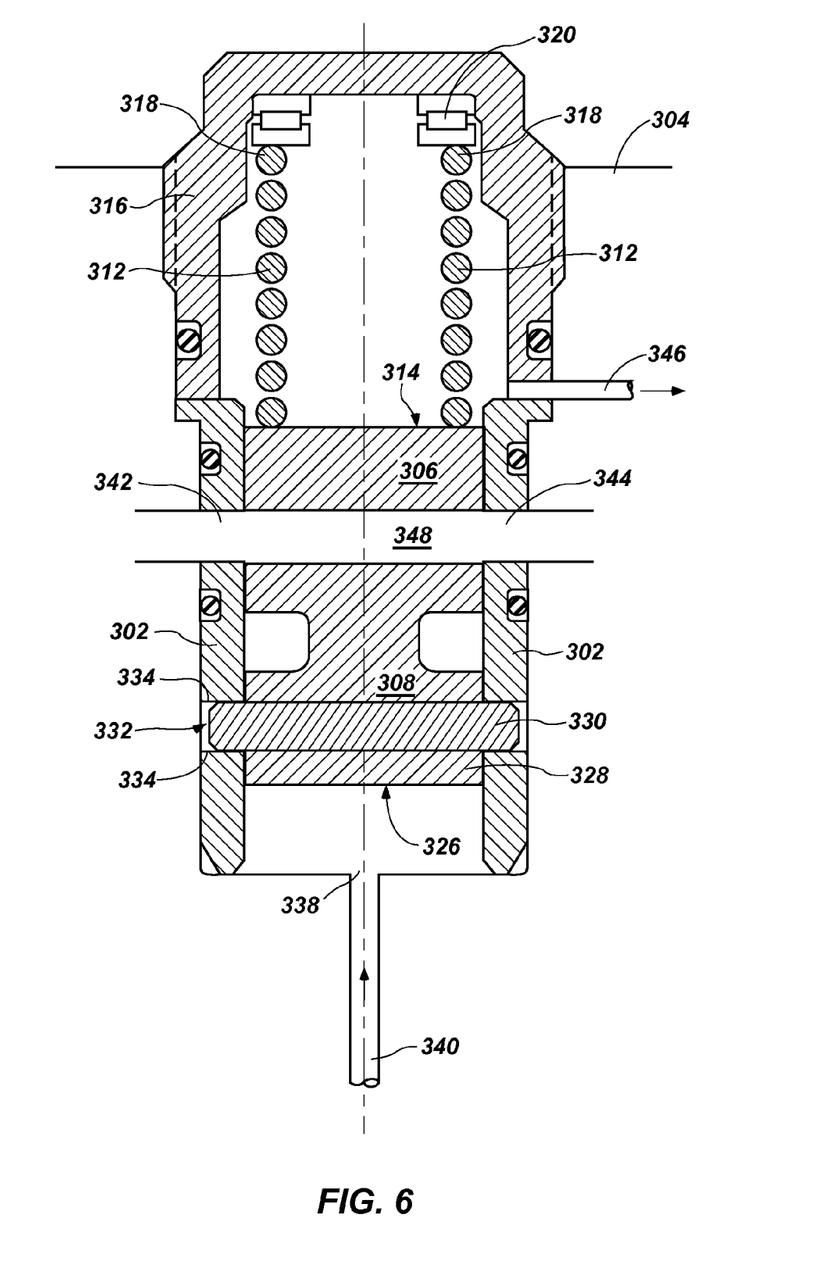
FIG. 6 is a cross-sectional view of the valve of FIG. 3, with the valve in the open position.

Shown in FIG. 6 is a cross-sectional view of the valve 300 of FIG. 3 with the valve element 306 in the open position. In this position the piston 308 is in a second, furthest extended position, and the valve element 306 is in a second position, with the valve aperture 348 aligned with the hydraulic ports 342, 344. The piston 308 and the biasing spring 312 thus operate together as an actuator, within the housing 302, which rotates the valve element 306 to selectively open or close the hydraulic ports 342, 344. Hydraulic pressure against the piston 308 causes the piston 308 and the valve element 306 to helically translate as an integral unit within the cylindrical housing 302 in the first direction, thereby causing at least axial rotation of the valve element 306 in the first direction.

The valve 300 thus converts a pilot pressure and otherwise linear motion of the piston 308 into rotational motion of the valve element 306 within the hydraulic valve assembly 300. By providing hydraulic pilot pressure to the cylinder 302 and applying the pilot pressure to an outer surface of the piston 308, the piston helically translates in a first direction within the cylinder 302 against the biasing member 312 and thereby moves the valve element 306 from one position to another (e.g. from the first position to the second position). Thus pressure against the piston 308 is converted into at least rotational motion of the valve element 306 in the first direction. Once pilot pressure is applied, the piston 308 begins to move and rotate the valve element 306. Continued application of the pilot pressure causes the valve element 306 to reach the first open position. Removing the pilot pressure from the piston 308 allows the valve element/piston 306/308 to return to the closed position under force of the biasing spring 312.

As noted above, in the embodiment of FIGS. 3 and 6 the piston 308 and the valve element 306 are integrally formed as a single, unitary element, and are thus configured to helically translate together within the housing 302. In other embodiments, discussed below, the piston and the valve element can be separate parts that are mechanically linked, so that the piston element helically translates, but causes the valve element to only rotate. Whether the valve element is configured only to rotate or to helically translate, its range of angular travel is fixed by the ends of the helical slot 332, which provide a stop mechanism for limiting the range of travel of the valve element/piston 306/308. When the piston 308 is in the first position, the pin 330 is pressed against the first end 350 of the slot 332 under the force of the spring 312. When the piston 308 is extended and the valve element 306 is rotated, the pin 330 stops against the second end 352 of the helical slot 332, and the degree of rotation of the valve element 306 is thus determined by the position of the second end 352 of the helical slot 332. This configuration of the helical slot with end stops can be beneficial for manufacturing and assembly purposes. For example, the pin and helix are provided on mating parts (the sleeve 302 and the piston 308) such that the piston is "clocked" relative to the sleeve, so that the piston can only be put into the sleeve in one position.

Figure 11:
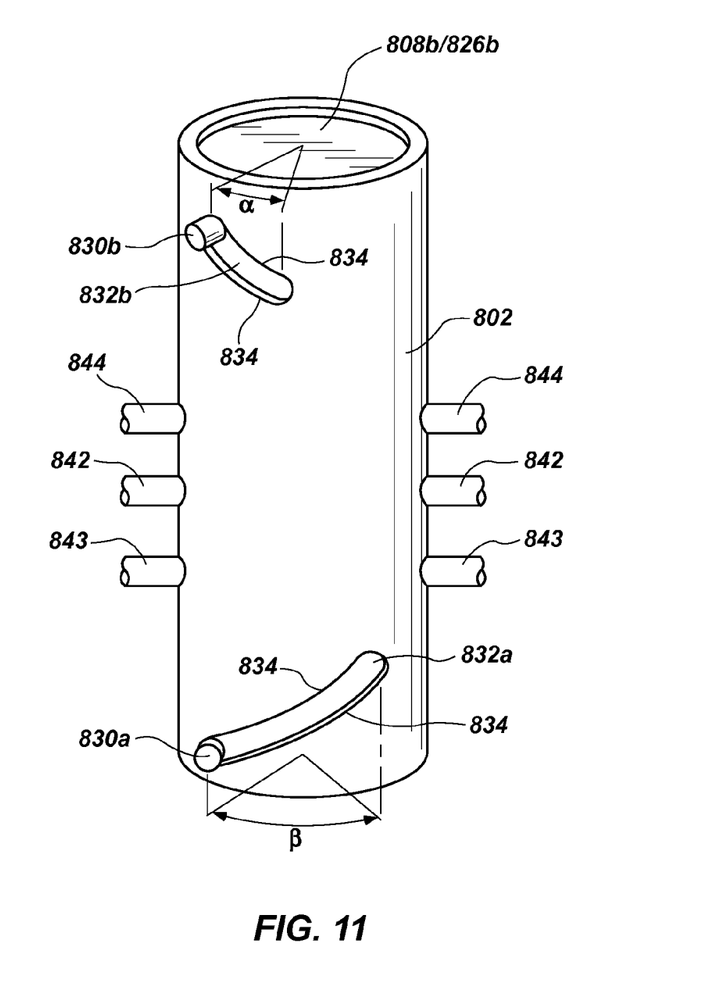
FIG. 11 is an external perspective view of the valve of FIGS. 8-10 assembled in its housing.

The degree of angular rotation of the valve element 306 between the closed and open positions of the valve can vary, and can be selected according to a variety of factors. The degree of angular rotation of the valve element between respective positions has reference to the angle of axial rotation of the valve element 308 between a position in which a given aperture is misaligned with a given set of ports, and the next adjacent position in which it is aligned with those ports, and vice versa. Angle α in FIG. 11 illustrates how the degree of angular rotation is measured, as that term is used herein. Returning to FIGS. 3 and 6, it will be apparent that the magnitude of rotation of the valve element 306 depends in part on the size or diameter of the valve aperture 348, since in the closed position the aperture 348 is misaligned with the hydraulic ports 342, 344, and in the open position it is aligned with them. A larger degree of rotation for the valve element 306 between these two positions can provide a better seal when the valve is closed, while a smaller degree of rotation between these positions can allow the valve to operate faster. It is believed that for suitable operation the first and second positions of the valve element can be angularly separated by an angle α of about 20° to 30°, though other angular separations can be used.

The valve element 306 of the embodiment shown in FIGS. 3 and 6 includes a single aperture 348, which communicates between a single pair of hydraulic ports 342, 344 in the housing 302. Alternatively, the housing can include multiple pairs of ports and the valve element can include multiple apertures which communicate between them. For example, the valve 204 shown in FIG. 2 includes a housing 240 having four pairs of ports 242, 244, 246 and 248. This valve has multiple hydraulic ports and first and second positions, with at least one of the first and second positions allowing fluid communication between each of the pairs of ports. The valve includes a valve element 250 that includes four apertures 252, 254, 256 and 258. In the closed or first position, shown in FIG. 2, the first and fourth hydraulic ports 242, 248 are closed, while the second and third hydraulic ports 244, 246 are open. In this position, servo valve 214 keeps the second hydraulic conduit 218 closed, while high pressure hydraulic fluid is passed into the third conduit 220 and passes through the second aperture 254 and the second hydraulic port 244 and thence to the retraction port 228 of the actuator 202, thus keeping the actuator retracted.

In the position of FIG. 2, lower pressure hydraulic fluid flows from the servo valve 214 into the first hydraulic conduit 216, which is in fluid communication with the return port 226 in the cap of the valve 204, and with the low pressure return line 232, which is fluidly connected to the output port 210 of the valve manifold 206. This lower pressure fluid also passes through the third aperture 256 and the third hydraulic port 246 to the extension port 230 of the actuator 202, but, being lower pressure, is insufficient to extend the actuator 202. This connection allows fluid to flow out of the extension port 230 of the actuator 202 during retraction of the actuator. In this condition, the actuator 202 remains retracted.

When the solenoid operated valve 222 opens, high pressure hydraulic fluid is provided through the pilot port 224 and presses against a piston 260, which is helically engaged with the housing 240 and thus helically translates the valve element 250. When this happens, the servo valve 214 can be configured to simultaneously open the second hydraulic conduit 218 and close the third hydraulic conduit. The motion of the valve element 250 causes the first and fourth apertures 252 and 258 to align with the first and fourth hydraulic ports 242 and 248, thus opening those ports and closing the others. In this condition high pressure hydraulic fluid passes through the first port 242 to the extension port 230 of the actuator 202, causing the actuator to extend. As before, the first hydraulic conduit 216, which leads to the output port 210, is in fluid communication with the return port 226 in the cap of the valve 204 and also passes through the fourth aperture 258, which allows lower pressure fluid from the return port 226 and from the retraction port 228 of the actuator 202 to flow back to the return line 232. Continuation of the pilot pressure in this manner causes the actuator 202 to remain extended.

In many hydraulic control systems, an electro-hydraulic servo valve (EHSV), like the servo valve 214 in FIG. 2, usually controls the direction of the high pressure fluid, while a separate spool valve or mode valve, functionally like valve 204, only serves to control ON and OFF. In this system, however, cross-port connections can also be achieved via the valve 204 (which is a mode valve). This can be desirable for applications where it is desired to remove the EHSV form the design, since this valve 204 is relatively small and can include a number of ports with internal logic in a reduced volume.

Figure 7:
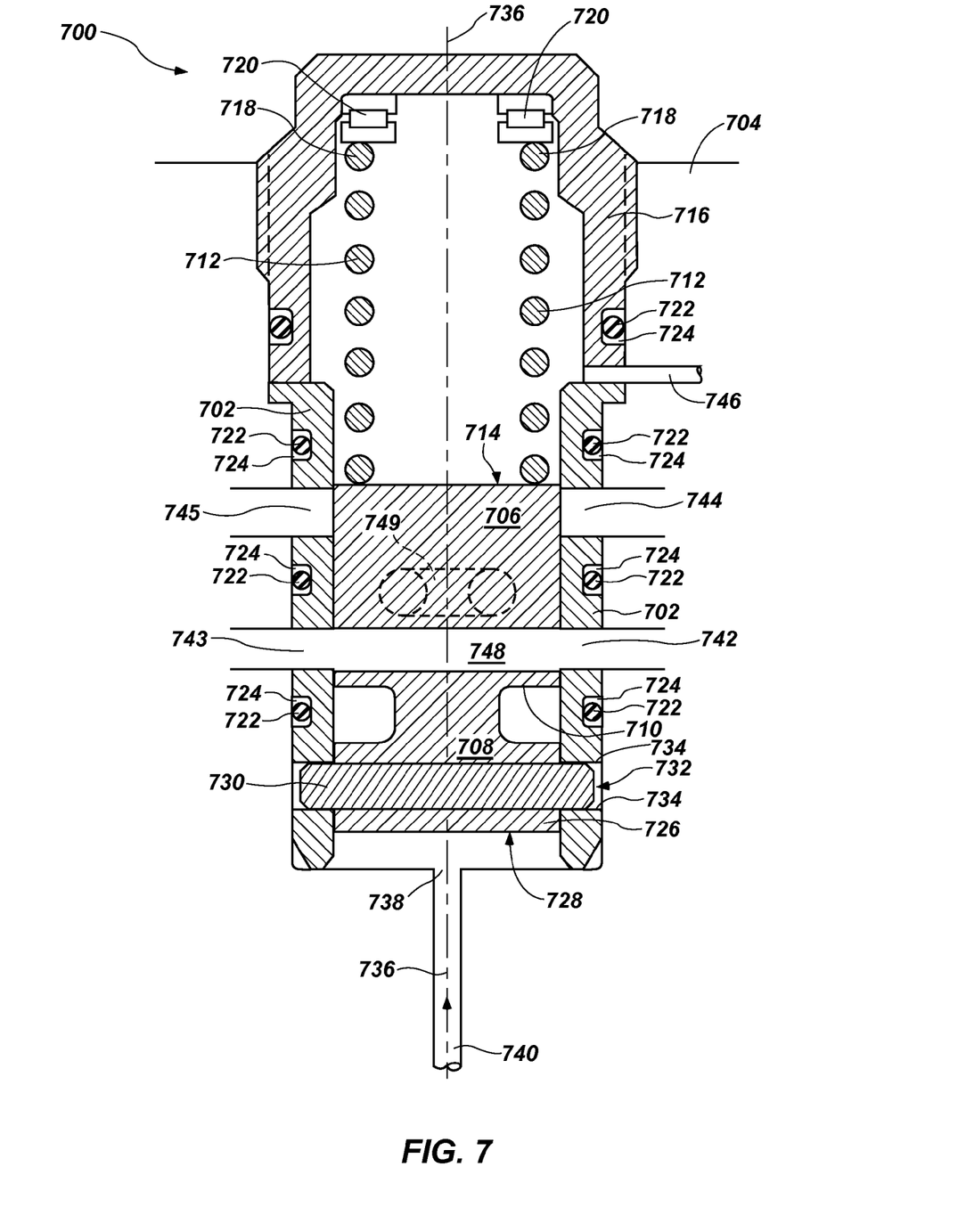
FIG. 7 is a cross-sectional view of an embodiment of a dual mode (open/close, close/open) hydraulic valve with a helical actuator in accordance with the present disclosure, with the valve in the first mode.

Other embodiments of valves having multiple pairs of ports can also be configured in accordance with this disclosure. Shown in FIG. 7 is a cross-sectional view of an embodiment of a dual mode (open/close, close/open) hydraulic valve 700 having a helical actuator in accordance with the present disclosure. This valve has multiple hydraulic ports and first and second positions, with at least one of the first and second positions allowing fluid communication between each of the pairs of ports. This valve 700 is similar to that of FIG. 3, and generally includes a housing or cylinder 702, which is mounted in a manifold 704 or other supporting structure. A valve element 706 is moveably disposed within the housing 702, and a piston 708 is mechanically coupled to the proximal end 710 of the valve element 706. Like the embodiment of FIG. 3, in the embodiment of FIG. 7, the valve element 706 and piston 708 are a single integral unit. A spring or other biasing member 712 is positioned against the distal end 714 of the valve element 706 within a cap 716, which is also supported in the manifold 704 and connected to the housing 702. The distal end 718 of the spring 712 can be positioned to bear against a thrust bearing 720, and one or more o-rings 722 can be disposed in suitable channels 724 in the housing 702 and the cap 716, and/or in the manifold 704, to provide a seal against leakage of hydraulic fluid.

The valve element/piston 706/708 includes a piston head 726 at its proximal end 728, and a distal end 714 that is positioned against the biasing spring 712. The valve element/piston 706/708 also includes a pin 730, extending transversely through it. This pin is configured to slide within a helical slot 732 in the housing 702, which allows the valve element/piston 706/708 to helically twist when the piston head 726 is pushed by hydraulic pressure urging it to move linearly within the sleeve 702, against the force of the biasing spring 712, as discussed above. The helical slot 732 has edges 734 that provide cam surfaces between the piston 708 and the housing 702, the cam surfaces causing axial rotation of the piston 708 as it linearly translates within the cylinder 702. The pitch or angle of the helical slot 732 relative to a long axis 736 of the housing 702 can be as discussed above.

The proximal end of the housing 702 includes a pilot pressure port 738, adjacent to the piston head 726, which allows high pressure hydraulic fluid from a pilot pressure line 740 to enter the housing 702. The housing 702 also includes two pair of hydraulic ports, including a first pair of ports 742, 743 and a second pair of ports 744, 745. The first and second pairs of ports can communicate between any desired hydraulic source(s) and destination(s). For example, each pair of ports can be in fluid communication between a high pressure hydraulic source (e.g. a hydraulic pump, not shown) and a respective hydraulic device (e.g. a hydraulic actuator, not shown). A hydraulic return line 746 is also fluidly connected to the cap 716, to allow the return of low pressure hydraulic fluid when the valve element/piston 706/708 extends.

As described above with respect to FIG. 3, the pilot pressure line 740 is connected through a valve, such as a solenoid operated ball valve, that selectively allows high pressure hydraulic fluid to flow to the pilot port 738. In the embodiment of FIG. 7, the valve element 706 is a generally cylindrical body and includes a pair of valve apertures 748, 749 extending transversely through it. In the view of FIG. 7, the valve is aligned in a first position, with the piston 708 in its furthest refracted position, and the first aperture 748 aligned with the first hydraulic ports 742, 743, thus allowing fluid communication between the first hydraulic ports, and the second aperture 349 misaligned with the second hydraulic ports, 744, 745, thus closing those ports. The valve element/piston 706/708 is biased toward this first position by the spring 712.

When hydraulic pressure is provided through the pilot port 738 and applied against the head 726 of the piston 708, this causes helical translation of the integral valve element/piston 706/708 from the first position (shown in FIG. 7) toward a second position, causing the first aperture 748 to rotate out of alignment with the first hydraulic ports 742, 743 (thereby closing those ports), and simultaneously causing the second aperture 749 to rotate into alignment with the second hydraulic ports 744, 745 (thus opening those ports). The cam surfaces 734 of the helical slot 732 act upon the transverse pin 730, causing helical translation of the piston 708 in a first direction, as discussed above, and concomitant motion (in this case helical translation) of the valve element 706 in the first direction from the first position toward the second position. As with the other embodiments discussed above, the piston 708 and the biasing spring 712 operate together as an actuator, within the housing 702, and function to rotate the valve element 706 to selectively open or close the hydraulic ports 742-745.

As noted above, the valve embodiments of FIGS. 3 and 7 show valves in which the piston and valve elements are integrally formed, and the integral unit helically translates together within the housing. Alternatively, the piston and valve elements can be separate structures, which mechanically contact each other. An embodiment of a valve 800 in which the piston and valve elements are separate is shown in FIGS. 8-11. Additionally, a valve in accordance with the present disclosure can have multiple pistons, and the valve element can have more than two positions. The valve 800 shown in FIGS. 8-11 also includes these features.

Figure 8:
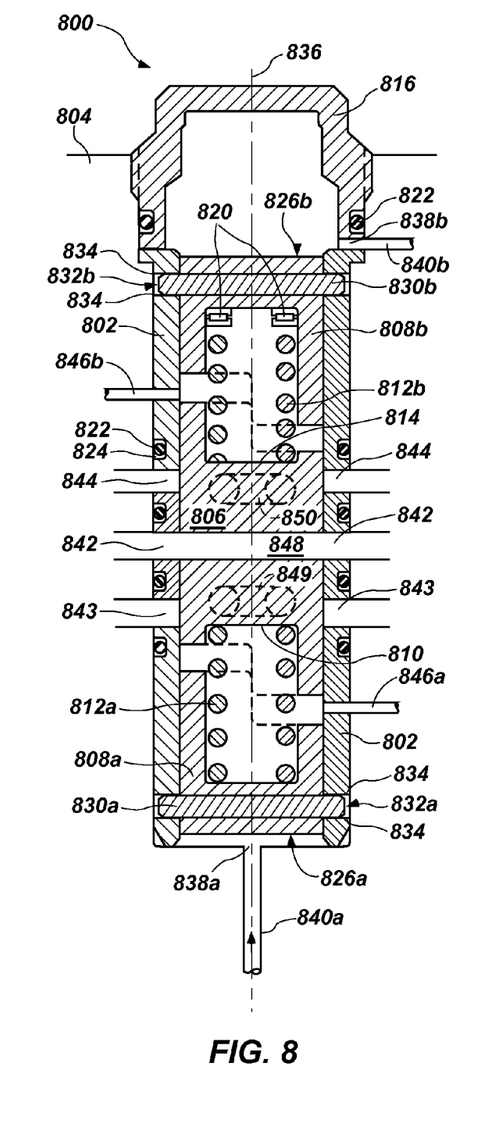
FIG. 8 is a cross-sectional view of an embodiment of a two-piston, three-mode hydraulic valve with a helical actuator in accordance with the present disclosure.
Figure 9:
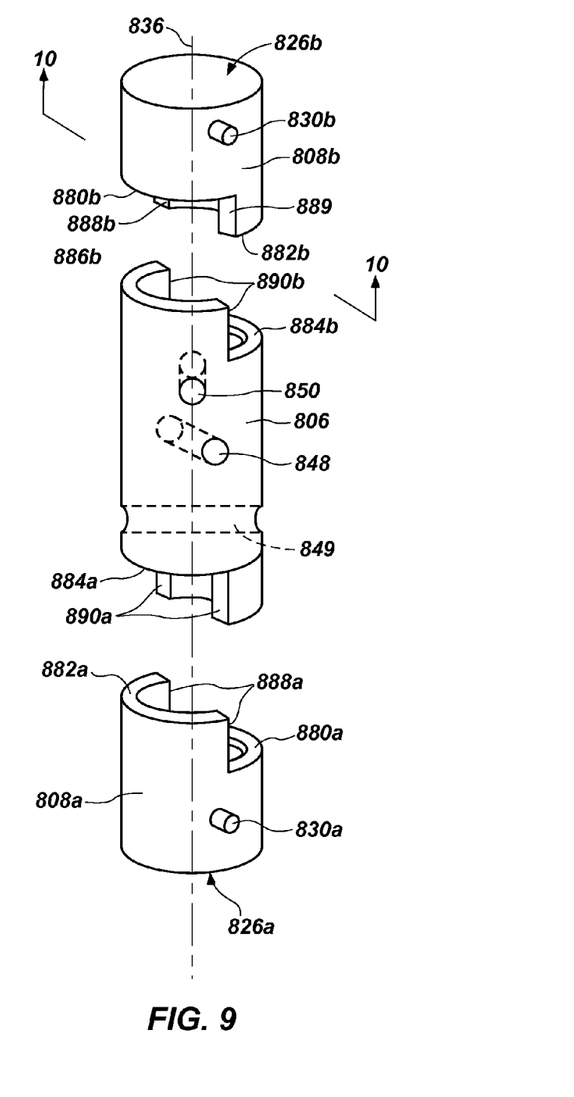
FIG. 9 is an exploded perspective view of the dual-piston and three position valve element of the valve of FIG. 8.
Figure 10:
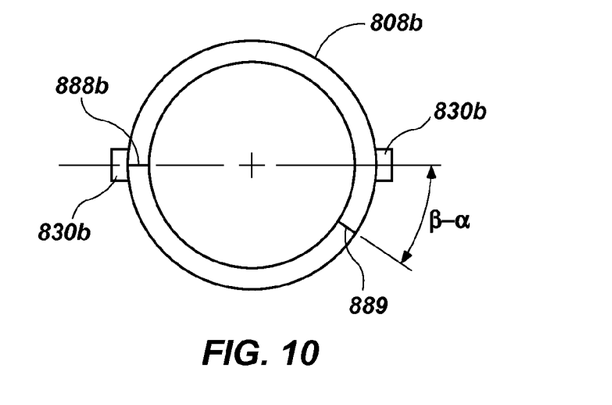
FIG. 10 is a detail view of the bottom of the upper piston of the dual-piston valve embodiment of FIGS. 8 and 9.

Shown in FIGS. 8-12 are various views of an embodiment of a two-piston, three-position hydraulic valve 800 having a helical actuator in accordance with the present disclosure. FIG. 8 provides an external perspective view of the housing of the assembled valve, FIG. 9 provides an exploded perspective view of the dual-pistons 808a, b and three position valve element 806 of the valve 800, and FIG. 10 is a detail view of the bottom of the upper piston 808b of the dual-piston valve 800. FIG. 11 provides an external perspective view of the housing of the assembled valve, and FIGS. 12A-C provide cross-sectional operational views of the valve 800 in each of its three operational positions or modes.

Viewing FIGS. 8 and 9, this valve 800 generally includes a housing or cylinder 802, which is mounted in a manifold 804 or other supporting structure. A three-position valve element 806 is rotatably disposed within the housing 802. There are two pistons, indicated generally at 808. The first piston 808a has a first piston head 826a and is positioned at the proximal end 810 of the valve element 806. The second piston 808b has a second piston head 826b and is positioned at the distal end 814 of the valve element 806. A first spring or other biasing member 812a is disposed between the first piston 808a and the proximal end 810 of the valve element 806, and a second spring 812b is positioned between the distal end distal end 814 of the valve element 806 and the second piston 808b. The springs 812 are located within a central hollow of each of the pistons 808 and the valve element 806, respectively. The distal end of the second spring 812b can bear against a thrust bearing 820 within the central hollow of the second piston 808b, allowing the second spring 812b to axially rotate relative to the second piston 808b. A cap 816, which is also supported in the manifold 804 and connected to the housing 802, surrounds and encloses the head 826b of the second piston 808b.

The proximal end of the housing 802 includes a first pilot pressure port 838a, adjacent to the first piston head 826a, which allows high pressure hydraulic fluid from a first pilot pressure line 840a to enter the housing 802 to impinge against the head 826a of the first piston 808a. The cap 816 (or the distal end of the housing 802) includes a second pilot pressure port 838b, adjacent to the second piston head 826b, which allows high pressure hydraulic fluid from a second pilot pressure line 840b to impinge against the second piston head 826b. The pilot pressure lines 840 are connected through one or more valves (not shown), which selectively allow high pressure hydraulic fluid to flow to the respective pilot port 838. First and second hydraulic return lines 846a, b can be provided in the housing 302 between each piston and the valve element, respectively, to allow the escape of hydraulic fluid from between these structures when a respective piston moves relative to the valve element. One or more o-rings 822 can be disposed in suitable channels 824 in the housing 802 and the cap 816, and/or in the manifold 804, to provide a seal against leakage of hydraulic fluid, in the manner discussed with respect to the other embodiments disclosed herein.

Like the embodiments discussed above, each piston 808 includes a pin, indicated at 830*a, b*, extending transversely through it, which is positioned to slide within a respective helical slot 832*a, b*, in the housing 802. These slots 832*a, b* are shown more clearly in the external view of FIG. 11. This configuration allows the respective piston 808*a, b* to helically twist when the respective piston head 826*a, b* is pushed by hydraulic pressure urging it to move linearly within the sleeve 802, against the force of the respective biasing spring 812*a, b*, as discussed above. Each helical slot 832*a, b* has edges 834 that provide cam surfaces between the respective piston 808*a, b* and the housing 802, the cam surfaces causing axial rotation of the piston 808*a, b* as it linearly translates within the cylinder 802. As shown in FIG. 11, the helical slots 832*a, b* twist in opposite directions, and each have a different angular extent, as will be discussed in more detail below. The pitch or angle of the helical slots 832*a, b* relative to a long axis 836 of the housing 802 can be as discussed above.

Unlike the embodiments discussed above, each piston 808*a, b* includes a shoulder 880*a, b*, with a tab 882*a, b* extending from the shoulder toward the valve element 806. The valve element 806 includes a pair of shoulders 884*a, b* on its proximal and distal ends, respectively, which each have a tab 886*a, b* extending therefrom toward the respective piston 808*a, b*. Each tab 886*a, b* of the valve element 806 includes longitudinal mating surfaces 890*a, b* that are substantially coplanar and aligned with the central axis 836 of the valve 800. The tab 882*a* of the first piston 808*a* also includes a pair of longitudinal mating surfaces 888*a*, and the tab 882*b* of the second piston 808*b* includes a pair of longitudinal mating surfaces 888*b* and 889. The mating surfaces 888*a* of the first piston tab 882*a* are substantially coplanar and aligned with the central axis 836 of the valve 800, and are disposed in sliding abutment with the corresponding first mating surfaces 890*a* of the first valve element tab 886*a* throughout the entire range of helical translation of both pistons 808.

However, the mating surfaces 888*b* and 889 of the second piston 808*b* are not coplanar, but are angularly offset, and are configured to be in sliding contact with the corresponding longitudinal mating surfaces 890*b* of the valve element 806 at different times during operation of the valve 800. This configuration is shown in FIG. 10, where it can be seen that the second mating surface 889 of the second piston 808*b* is angularly offset relative to the first mating surface 888*b* by an angle having a magnitude of β−α. This offset angle is related to the angular extent of the oppositely oriented helical slots 832*a, b* in the housing 802, shown in FIG. 11. As shown in FIG. 11, the first helical slot 832*a* defines an angular extent β. The second helical slot 832*b* defines an angular extent α, which is smaller than β. The angular offset of the second mating surface 889 of the second piston 808*b* relative to an otherwise coplanar arrangement is the difference between these two angles, or β−α.

With this configuration, helical translation of either of the pistons 808 (the respective translations being in opposite directions) will cause axial rotation of the valve element 806 in one direction, but to a different extent, depending on which piston is translated, as described below. The mating surfaces 888/890 transmit rotational motion from the respective pistons 808 to the valve element 806, while the axial sliding motion of the respective mating surfaces 888*a*/890*b* will prevent either piston 808 from transmitting axial translation to the valve element 806.

Figure 12A:
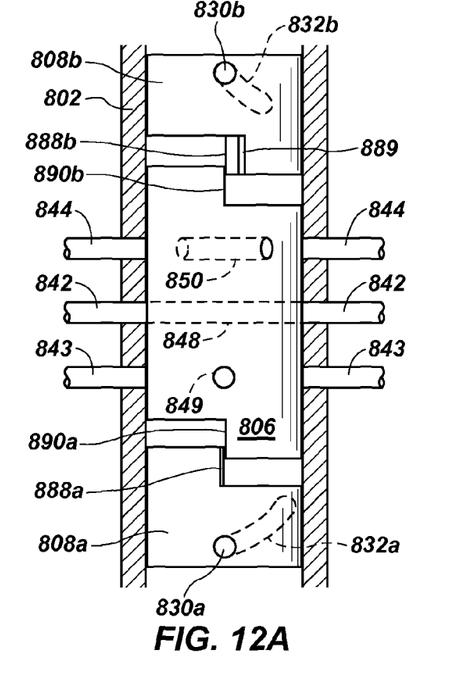
FIGS. 12A-C are partial cross-sectional operational views of the dual-piston, three-mode hydraulic valve of FIGS. 8-11.

In the embodiment of FIG. 8 the housing 802 includes three pair of hydraulic ports, 842, 843 and 844, and the valve element includes three corresponding valve apertures 848, 849, 850 extending transversely through it. As discussed above, these pairs of hydraulic ports 842, 843 and 844 can communicate between any desired hydraulic source(s) and destination(s). Advantageously, the valve element 806 is moveable between three positions. In the views of FIG. 8 and FIG. 12A, the valve is aligned in a first or neutral position, with the first and second pistons 808*a, b* located in their furthest refracted positions (i.e. furthest away from the valve element 806), and the first aperture 848 aligned with the first pair of hydraulic ports 842, thus allowing fluid communication between the first hydraulic ports 842. In this first position, the second and third apertures 849, 850 are misaligned with the second and third hydraulic ports 843, 844, thus closing those ports. It is to be noted that in this first position, the mating surfaces 888*a* of the first piston tab 882*a* are disposed in sliding contact with the corresponding first mating surfaces 890*a* of the first valve element tab 886*a*. At the same time, the first mating surface 888*b* of the second piston tab 882*b* is disposed in sliding contact with the corresponding first mating surface 888*b* of the second valve element tab 886*b*, while the angularly offset mating surface 889 of the second piston 808*b* is not in contact with the corresponding mating surface 888*b* of the second valve element tab 886*b*, but is angularly offset, as described above.

When hydraulic pressure is provided through the second pilot port 838*b* and applied against the head 826*b* of the second piston 808*b*, this causes helical translation of the second piston 808*b* toward the valve element 806, against the force of the second spring 812*b*. The cam surfaces 834 of the second helical slot 832*b* act upon the second transverse pin 830*b*, causing helical translation of the piston 808 in a first direction. Because of this motion, the first mating surface 888*b* of the second piston 808*b* transmits rotational motion of the second piston 808*b* to the valve element 806 through the second mating surface 890*b* of the valve element 806, while the mating surfaces 888*b*, 890*a* themselves linearly slide past each other, so that the valve element 806 experiences little or no linear travel.

Figure 12B:
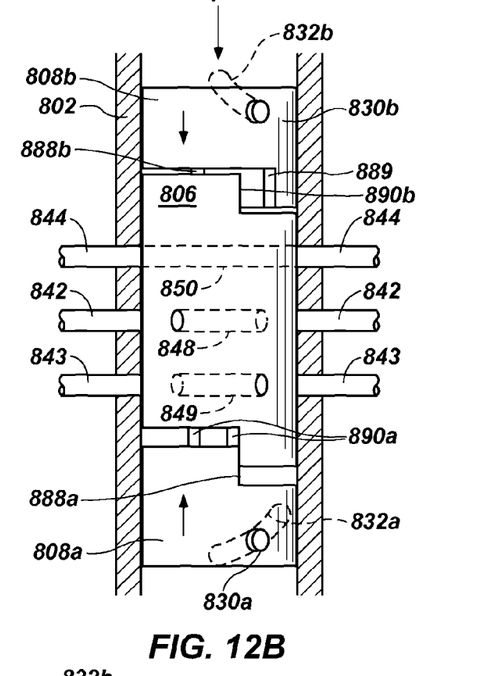

With continued application of the pilot pressure through the second pilot port 838*b*, the valve element 806 will rotate through an angle α until the second pin 830*b* reaches the end of the second helical slot 832*b* (FIG. 10), at which point the valve element 806 will have reached the second position, which is shown in FIG. 12B. Through this motion, the valve element 806 rotates in a first direction from its first position to the second position, wherein the first aperture 848 is rotated out of alignment with the first hydraulic port 842, thus closing this port, and the third aperture 850 is simultaneously rotated into alignment with the third hydraulic port 844, thereby opening this port. The second aperture 849 also rotates as the valve element 806 rotates, but it too remains misaligned with the second hydraulic port 844, keeping this port closed.

It is to be noted that during rotation of the valve 800 from the first position to the second, the first piston 808*a* also rotates through angle α, in the same direction, because the mating surfaces 888*a* of the first piston tab 882*a* are disposed in sliding contact with the corresponding first mating surfaces 890*a* of the first valve element tab 886*a*. Thus, rotation of the second piston 808*b* is transmitted through the valve element 806 to the first piston 808*a*. By this motion the first piston 808*a* will also helically translate (and draw upward in the views of FIGS. 8 and 12), since the first pins 830*a* are slidingly disposed in the first slot 832*a*. Thus the first spring 812*a* will also be compressed, and the first pin 830*a* will move to some midpoint location within the first helical slot 832*a*, as shown in FIG. 12B. However, since rotational force upon the valve element 806 originates from the second piston 808*b*, the first mating surface 888*b* of the second piston tab 882*b* will remain in contact with the corresponding first mating surface 888*b* of the second valve element tab 886*b*, while the angularly offset mating surface 889 of the second piston 808*b* will remain angularly offset and not in contact with the valve element 806.

When hydraulic pressure is released from the second pilot port 838*b* the biasing force of both springs 812 will cause helical translation of the both pistons 808 back to their first positions, respectively, thus reversing the motion of the valve element 806 back to its first position, with the first aperture 848 aligned with the first pair of hydraulic ports 842, and the second and third hydraulic ports 843, 844 closed.

When hydraulic pressure is provided through the first pilot port 838*a* and applied against the head 826*a* of the first piston 808*a*, this causes helical translation of the first piston 808*a* toward the valve element 806, against the force of the first spring 812*a*. The cam surfaces 834 of the first helical slot 832*a* act upon the first transverse pin 830*a*, causing helical translation of the first piston 808*a* in the first direction. The first piston 808*a* helically translates in the first direction because while the first helical slot 832*a* is oriented opposite to the second helical slot 832*b*, the hydraulic pressure against the first piston head 826*a* is in the opposite direction relative to the hydraulic pressure against the second piston 808*b*. Because of this helical motion of the first piston 808*a*, the mating surfaces 888*a* of the first piston 808*a* transmit rotational motion of the first piston to the valve element 806 through the first mating surfaces 890*a* of the valve element 806, while the mating surfaces 888*a*/890*a* themselves linearly slide past each other, so that the valve element 806 experiences little or no linear travel.

Figure 12C:
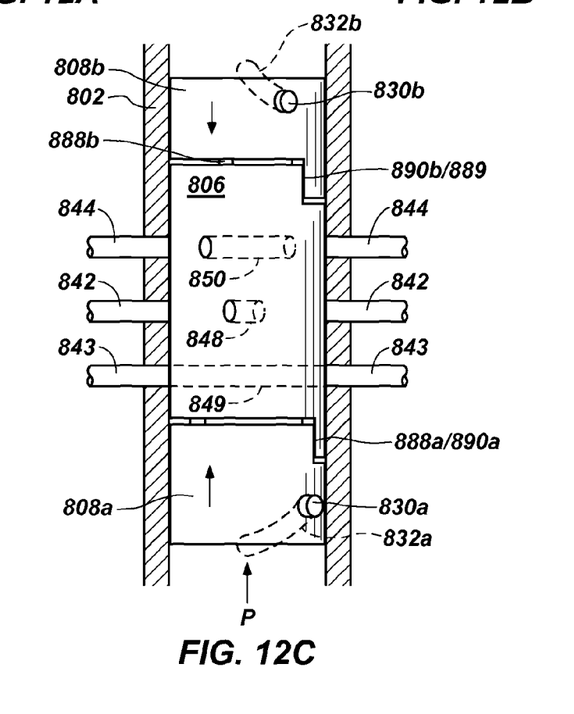

With continued application of the pilot pressure through the first pilot port 838*a*, the valve element 806 will reach the third position, as shown in FIG. 12C. Through this motion, the valve element 806 rotates through angle β in the first direction from the first position, past the second position, to a third position, wherein the first aperture 848 is rotated out of alignment with the first hydraulic port 842, thus closing this port, and the second aperture 849 is simultaneously rotated into alignment with the second hydraulic port 843, thereby opening this port. Again, during this motion the third aperture 850 also rotates as the valve element 806 rotates, but it only momentarily aligns with its respective ports, and moves past this point of alignment to again become misaligned with the third hydraulic port 844, keeping this port closed. In this way, linear motion of the first piston 808*a* is converted into rotational motion of the valve element 806 in the first direction between the first position and the third position. When hydraulic pressure is released from the first pilot port 838*a* the biasing force of both springs 812 causes helical translation of both pistons 808 back to their first positions, thus reversing the motion of the valve element 806 back again to its first position.

During rotation of the valve 800 from the first position to the third position, driven by the first piston 808*a*, the second piston 808*b* will initially remain motionless. Because of the offset mating surface 889, the second tab 886*b* of the valve element 806 will be able to rotate through an angle equal to this offset (a distance of β−α, as discussed above) before the corresponding mating surface 890*b* contacts the mating surface 889. During this motion, the first mating surface 888*b* of the second piston will come out of contact with the corresponding mating surface 890*b* of the valve element. Since the valve element 806 and second piston 808*b* are rotating with respect to each other during this motion, the second spring 812*b* can rotate with the valve element, rotating against the thrust bearing 820 in the second piston.

Once the intermediate point is reached, with the mating surface 890*b* of the valve element 806 contacting the offset mating surface 889, continued motion of the first piston 808*a* through angle β will be transmitted through the valve element 806 to the second piston, causing the second piston 808*b* to helically translate through angle α in the same direction, the second pins 830*b* sliding in the second slot 832*b*. When the pins 830*a* of the first piston 808*a* reach the distal end of the first helical slot 830*a*, the second pins 830*b* of the second piston 808*b* will reach the distal end of the second slot 832*b*, as shown in FIG. 12C. Thus, rotation of the first piston 808*a* is transmitted through the valve element 806 to the second piston 808*b*, causing the second piston 808*b* to helically translate (and draw downward in the views of FIGS. 8 and 12), thus again compressing both the first and second springs 812*a*, *b*.

With this configuration the valve element 806 is selectively rotatable between the first position, shown in FIGS. 8 and 12A, and second and third positions, shown in FIGS. 12B and C, thus selectively allowing fluid communication between the multiple ports. The pistons 808*a*, *b* and the biasing springs 812*a*, *b* operate together as a pair of actuators within the housing 802, and function to selectively rotate the valve element 806 to selectively open or close the hydraulic ports 842-844. Both pistons 808 move when the valve shifts from the first position to either the second or third position. The difference depends upon which piston is provided with active pilot pressure, and the magnitude of the movement (as governed by the helical slots 832). The helical slots 832 are wound in opposite directions, so that when the first or lower piston 808*a* rotates and travels upward in its slot 832*a*, the second piston 808*b* is forced to rotate and travel downward in its slot 832*b*, and vice versa. Same principle applies when the upper piston is energized. However, since one slot 832*a* defines an angle β which is longer than the other slot 832*b*, which defines angle α, different magnitudes of angular rotation are achieved. The angular offset (having magnitude β−α) of the mating surface 889 of the second piston 808*b* accommodates this differential angle and prevents mechanical opposition by the respective pistons.

When it is desired to actuate the valve 800 shown in FIG. 8 from the first or neutral position to either the second or third position, hydraulic pressure is provided to the desired pilot port 838*a* or *b*, and simultaneously released from (or reduced to) the opposing pilot port 838*a* or *b* and from the first and second hydraulic return lines 846*a*, *b* in order to allow the escape of hydraulic fluid, so that competing pressures do not obstruct motion of the pistons 808. For example, when the first piston 808*a* is actuated, hydraulic pressure is released from the second pilot port 838*b* and the hydraulic return lines 846*a*, *b*, while at the same time taking care not to produce a situation in which hydraulic pressure could prevent the second piston 808*b* from moving. Likewise, when the second piston 808*b* is actuated, hydraulic pressure is released or reduced from the first pilot port 838*a* and the hydraulic return lines 846*a*, *b*, while again taking care not to produce a pressure situation that would obstruct motion of the first piston.

The valve disclosed herein thus provides several desirable features and functions. It provides a driving element (a piston) inside a sleeve, which receives pilot pressure on one side, with a helical cam feature interconnected between the sleeve and the driving element. The cam feature has a relatively large pitch to match the amount of rotation/angle desired to rotate the valve element in order to open and close ports for a given linear translation of the driven element. The piston follows a helical translation once the piston head is pressurized, which will push the piston against the compression spring. The driven element (valve element) contains one or more passages that can connect a plurality of ports, providing a form of built-in operational logic for the valve. The spring spring-loads the piston toward a first position, or in the case of a two piston embodiment, biases both pistons toward a first or neutral position. Depending upon the configuration of the valve element, this spring-loading can assure that the hydraulic ports are normally closed, and only open as pressure is applied. Spring-loading can also ensure that the assembly stays together.

Advantageously, the configuration shown herein provides a self-actuated valve, such that no separate or detached actuator is needed. Instead, the valve and the mechanism for actuating it are both inside the same sleeve. This valve can help provide weight and space savings in systems that use it, such as aircraft. For example, it is believed that this helical valve assembly can be 30% to 50% shorter than current spool valves that are used for similar function. This valve configuration can also enable a cost reduction because it is smaller than some other valves used for similar purposes, and thus uses less materials and likely involves less time and labor for fabrication. This can be especially desirable where high cost materials such as titanium are used.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A hydraulic spool valve, comprising:
   a housing, having a pair of first ports;
   a valve element, comprising a generally cylindrical body having an enclosed passage extending transversely therethrough, the valve element being selectively moveable within the housing between a first closed position in which the enclosed passage is misaligned with the first ports, and a second open position in which the enclosed passage is substantially aligned with the first ports, allowing fluid communication between the first ports;
   a first piston, coupled to the valve element, hydraulic pressure against the first piston causing helical translation of the piston in a first direction, and motion of the valve element in a first direction from the first position toward the second position; and
   a first biasing member, configured to bias the first piston and the valve element toward the first position.

2. A valve in accordance with claim 1, wherein the valve element and the first piston comprise a single integral valve body, hydraulic pressure against the first piston causing helical translation of the integral valve body between the first and second positions.

3. A valve in accordance with claim 1, further comprising a helical cam actuator, coupled between the first piston and an interior wall of the housing.

4. A valve in accordance with claim 3, wherein the helical cam actuator comprises a helical slot in an inner wall of the housing, and a pin, fixed to the first piston and extending into the slot, the pin being slidable within the slot.

5. A valve in accordance with claim 4, wherein the helical slot has a pitch of from 40° to 65°.

6. A valve in accordance with claim 1, wherein the valve element is configured for at least axial rotation, and the first and second positions of the valve element are angularly separated by 20° to 30°.

7. A valve in accordance with claim 1, wherein the housing includes multiple pairs of ports, at least one of the first and second positions allowing fluid communication between each of the pairs of ports.

8. A valve in accordance with claim 1, further comprising:
   a pair of second ports in the housing, the valve element being selectively moveable between the first position, the second position, and a third position allowing fluid communication between the second ports;
   a second piston, coupled to the valve element and helically moveable within the housing, hydraulic pressure against the second piston causing helical translation of the second piston in the first direction, and axial rotation of the valve element in the first direction toward the third position; and
   a second biasing member, configured to bias the second piston and the valve element toward the first position and away from either the second or third positions, the first biasing member further configured to bias the first piston and the valve element toward the first position and away from either the second or third positions.

9. A valve in accordance with claim 8, further comprising a first pilot pressure conduit, configured to supply hydraulic fluid for providing hydraulic pressure against the first piston, and a second pilot pressure conduit, configured for providing hydraulic pressure against the second piston.

10. A hydraulic manifold, comprising:
    a cylindrical housing, having a pair of first ports configured to couple between a hydraulic source and a hydraulic device;
    a cylindrical valve element, rotatably disposed within the housing, having a first enclosed passage extending transversely therethrough, having a first position in which the first enclosed passage is misaligned with the first ports such that the first ports are closed, and a second position in which the first enclosed passage is aligned with the first ports such that the first ports are open and fluidly connected;
    an actuator, disposed within the housing, configured to rotate the valve body to selectively open or close the ports, the actuator including
       a first piston, mechanically coupled to the valve element and helically moveable in a first direction against a first cam surface of the housing in response to hydraulic pressure; and
       a first spring, configured to bias the piston and the valve element toward the first position, helical translation of the piston in the first direction causing at least axial rotation of the valve element in the first direction.

11. A hydraulic manifold in accordance with claim 10, wherein the cam surface has a pitch of from 40° to 65° and the first and second positions of the valve element are angularly separated by 20° to 30°.

12. A hydraulic manifold in accordance with claim 10, wherein the housing includes multiple pairs of ports, at least one of the first and second positions allowing fluid communication between each of the pairs of ports.

13. A hydraulic manifold in accordance with claim 10, further comprising:
    a pair of second ports in the housing, the valve element being selectively rotatable between the first position, the second position, and a third position allowing fluid communication between the second ports;
    a second piston, coupled to the valve element and helically moveable in the first direction against a second cam surface of the housing, hydraulic pressure against the second piston causing helical translation of the second piston in the first direction and axial rotation of the valve element in the first direction toward the third position; and a second biasing member, configured to bias the second piston and the valve element toward the first position and away from either the second or third positions, the first biasing member further configured to bias the first piston and the valve element toward the first position and away from either the second or third positions.

14. A hydraulic manifold in accordance with claim 10, wherein the valve element and the first piston comprise a single integral valve body.

15. A method for converting a pilot pressure and a linear motion into a rotational motion within a hydraulic helical valve assembly, comprising:

providing hydraulic pilot pressure to a cylinder having a first moveable piston therein, the first piston being mechanically coupled to a moveable valve element having a first transverse enclosed passage extending therethrough;

applying the pilot pressure to an outer surface of the first piston, causing the first piston to helically translate in a first direction within the cylinder against a first biasing member and thereby move the valve element, whereby linear pressure against the first piston is converted into at least rotational motion of the valve element in the first direction between a closed position and a first open position in which the first transverse enclosed passage is aligned with respect to at least a first pair of valve ports in the cylinder; and continuing application of the pilot pressure until the valve element reaches the first open position.

16. A method in accordance with claim 15, further comprising:

removing the pilot pressure from the outer surface of the first piston; and allowing the first piston and the valve element to return to the closed position under force of the first biasing member.

17. A method in accordance with claim 15, wherein causing the first piston to helically translate within the cylinder comprises engaging the piston with the cylinder via a first cam surface, coupled between the first piston and the cylinder, the cam surface causing axial rotation of the first piston as it linearly translates within the cylinder.

18. A method in accordance with claim 15, further comprising:

removing the pilot pressure from the outer surface of the first piston;

applying hydraulic pilot pressure to an outer surface of a second piston, moveably disposed in the cylinder and mechanically coupled to the valve element, causing the second piston to helically translate in the first direction within the cylinder against a second biasing member, whereby linear motion of the second piston is converted into rotational motion of the valve element in the first direction between the closed position and a second open position with respect to at least a second pair of valve ports in the cylinder; and continuing application of the pilot pressure until the valve element reaches the second open position.

19. A method in accordance with claim 15, wherein causing the first piston to helically translate within the cylinder against the first biasing member further comprises causing the first piston and the valve element to helically translate as an integral unit within the cylinder.

\* \* \* \* \*